Oct. 2, 1934.  W. F. RESCHKE  1,975,406
FEED MILL
Filed Aug. 10, 1931
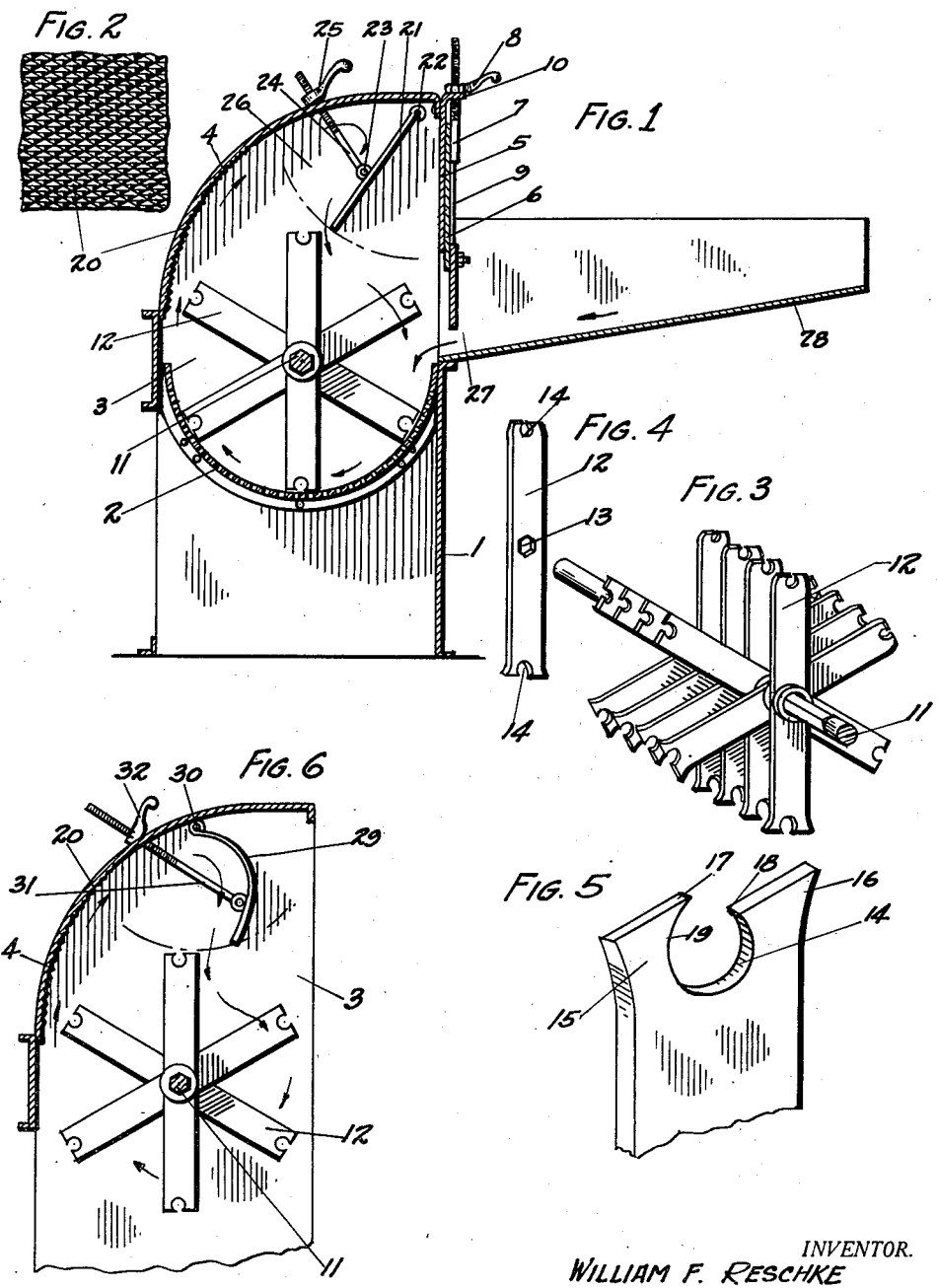
INVENTOR.
WILLIAM F. RESCHKE
BY
ATTORNEY.

Patented Oct. 2, 1934

1,975,406

UNITED STATES PATENT OFFICE 1,975,406

FEED MILL

William F. Reschke, Wichita, Kans.

Application August 10, 1931, Serial No. 556,116

1 Claim. (Cl. 83—11)

This invention relates to feed mills and particularly to a mill for grinding feed or vegetable matter. In such a mill, it sometimes happens that the material to be ground packs in the mill with the result that there is a dead space where the material accumulates, therefore, the material is not efficiently ground.

I have provided a mill in which a deflector is so positioned that the material will be directed back into the zone through which the knives pass so as to insure that all of the material will be efficiently treated and the deflector is so arranged that none of the material will be thrown toward the inlet end of the casing so as to clog the inlet or to prevent the passage of incoming material. I have also provided a novel form of cutting knife or hammer for the mill.

The novelty of the invention will be understood by reference to the following description in connection with the accompanying drawing in which:

Fig. 1 is a vertical, sectional view through a mill constructed in accordance with my invention.

Fig. 2 is a plan view of a portion of the inner wall of the casing.

Fig. 3 is a perspective view of the knife cylinder unit.

Fig. 4 is a detailed view of one of the knives.

Fig. 5 is an enlarged perspective view of one of the knives, and

Fig. 6 is a partial, sectional view through a modified form of mill.

The mill is illustrated as comprising a base 1 with a casing consisting of the semi-circular screen 2, the sides 3, back 4 and front plate 5. The front plate carries a vertically adjustable gate 6 controlled by a screw 7 and a nut 8. The screw 7 is fast to the gate, guided by the bar 9 and the nut 8 rests on the flange 10 of the plate 5 so that by turning the nut, the gate can be raised and lowered.

It is to be understood that there are two side walls 3 to the casing. These walls support a transverse shaft 11 on which the cutting knives 12 are mounted at their middle portions. The shaft 11 is shown as angular in cross-section and it passes through the angular openings 13 in the knives so that the knives will not turn on the shaft. The knives are alternately arranged cross-wise of one another as shown. Each knife has its ends provided with circular notches 14 to provide prongs 15 and 16. The prongs are slightly twisted in opposite directions so that the points 17 and 18 are out of alinement to provide cutting edges 19. The knives can be reversed so that when one prong becomes dull, the opposite prong can be used.

Part of the wall of the casing is provided with a roughened surface 20 to assist in macerating the material as it passes around in the concave or casing of the mill. The shaft 11 can be turned by any suitable means and it rotates in a clockwise direction as indicated by the arrows.

In the upper part of the casing is a deflector shown as a plate 21 pivoted to the casing at 22 and having an eye 23 engaged by the bolt 24 which passes through the casing and carries a wing nut 25 so that the deflector can be adjusted to different positions to throw the material back into the cylinder at different angles.

It will be noted that as the cylinder rotates, the material to be ground is carried by the cylinder at a high rate of speed over the screen surface in the lower concavity of the mill and the particles that have not been disintegrated sufficiently to pass through the screen are thrown by centrifugal force from the cylinder into the upper portion of the cylinder casing, where, carried by their own momentum they follow the contour of the casing until they contact with the adjustable deflector which, by proper adjustment according to the weight or density of the material, turns its course back into the cylinder thus increasing the impact in ratio to the periphery speed of the cylinder plus the momentum of the material.

In the modification, Figure 6, only so much of the mill is shown as has to do with the deflector and the cylinder. The deflector shown in Figure 6 consists of a curved plate 29 pivoted at 30 and operated by a screw 31 and nut 32 similar to the screw 24 and the nut 25. The deflector may be either flat or curved but I prefer the flat plate shown in Figure 1.

From the foregoing it will be apparent that the liability of the material packing or clogging in the casing so that it will not be acted upon by the knives will be entirely eliminated and in actual practice, I have found that with the deflector located within the casing and operating as a distinctive element separate from the gate, that the capacity of the mill is increased and the fineness of the material is enhanced.

What I claim and desire to secure by Letters Patent is:—

A feed grinder comprising a casing, a cylinder and screen concave in the casing, the casing having an inlet opening above the screen concave, the cylinder having rotative movement toward the opening, a pivoted deflector plate within the upper part of the casing above the cylinder and having a free end adjacent the cylinder movable in an arc toward the back of the concave and means for holding the deflector plate in fixed position.

WILLIAM F. RESCHKE.